UNITED STATES PATENT OFFICE 2,394,246

DISAZO DYESTUFFS

Hans Z. Lecher, Plainfield, Robert P. Parker, Somerville, and John J. Denton, Bound Brook, N. J., assignors to American Cyanamid Company, New York, N. Y., a corporation of Maine No Drawing. Application July 3, 1944, Serial No. 543,439

6 Claims. (Cl. 260—177)

This invention relates to a new series of azo dyestuffs derived from 4,4'-diaminodiphenyl ether. These dyestuffs may be represented by the following formula:

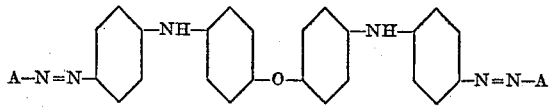

in which A is the residue of a coupling component.

The coupling component may be one containing solubilizing groups but we prefer to produce ice colors, in which case A is an ice color coupling component, as these colors are of greatest commercial value.

In the past there has been a demand for ice-colors having strong blue to violet shades. Many attempts have been made to produce such dyestuffs and in many cases the fastness properties such as fastness to light, heat and washing have left much to be desired. It is an advantage of the present invention that ice-colors of strong blue to violet shades can be produced which as pigments or dyes exhibit superior fastness properties such as fastness to light, heat and washing.

The present invention is, of course, not concerned with the method by which the aminophenyl diaminodiphenyl ether is prepared. This compound and process of making it form part of the subject matter of our copending application Serial No. 543,438, filed July 3, 1944. In general, it may be prepared by reacting 4,4'-diaminodiphenyl ether with a 1-halogen-4-nitro benzene which may or may not contain a negative substituent in the 2-position such as a sulfonic group. The condensation is followed by a reduction of the nitro group which may take place in alkaline or acid medium, the pH determining whether the free base or its salts are produced.

In the process of tetrazotization higher temperature, greater concentration of the base and higher mineral and nitrous acid concentrations tend to produce N-nitroso derivatives of the tetrazonium salt. It is, therefore, in general preferable to use lower temperature, lower acid concentration and slower addition of nitrite in order to prevent production of the N-nitroso derivatives as these products give duller and less desirable shades on coupling. It is possible to hydrolyze the derived N-nitroso dyestuffs in dilute solution by heating with alkalies such as soda ash. If desired, reducing agents such as sodium sulfide or sodium bisulfite and the like may be included in the hydrolysis step in order to destroy nitric oxides as they are liberated.

In their tetrazotized form, the bases used to produce the products of the present invention may be coupled either with or without a substrate, to yield dyestuffs or pigments of great value because of their strength, variety of shade, and fastness properties. In particular, however, these bases are important for the production of fast blue prints or dyeings upon cellulosic materials which are the preferred form of the present invention. These are produced, in general, by impregnating the cellulosic material in alkaline baths with appropriate ice-color coupling components and then printing solutions of the tetrazotized bases which have been buffered and thickened upon such prepared cloth, or by pad dyeing the prepared cloth in buffered solutions of the tetrazotized bases.

Solutions of these tetrazotized bases may also be treated with inorganic alkali metal salts or alkaline-earth metal salts, or with mixtures of these salts together with appropriate inorganic metal salts whereupon the tetrazonium salts or metal salt complexes of the tetrazonium salts are precipitated. These may be separated, dried, stored or blended with inorganic salts such, for example, as with sodium or potassium chlorides, sulfates, magnesium sulfate, aluminum sulfate and the like; the latter preferably being used in their partially dehydrated forms. Such products may be readily dissolved in water to yield solutions from which cellulosic materials which have previously been impregnated in alkaline grounding baths with appropriate ice-color coupling components may be suitably pad dyed, or the solutions may be appropriately thickened and printed upon the prepared cellulosic fabrics.

The base used to prepare the products of the present invention may also be converted into tetrazo-sulfonates which may be isolated from solution, dried, stored or they may be blended in the dry state with appropriate ice-color coupling components and oxidizing agents. Such blends may be incorporated into a printing paste, printed upon vegetable fibers and the pigment developed by treatment with steam, or with steam in the presence of weak acid vapors.

Substantially any of the ice-color coupling components are generally useful for production of insoluble, developed dyes, and enable the production of a variety of colors from yellow to blue. However, for the present purposes, the use of arylides of 2-hydroxy-3-naphthoic acid is preferable. These produce, when coupled with the tetrazotized bases according to the present invention, the most desirable blue to violet shades.

However, the invention is not necessarily so limited. Among other ice-color coupling components which produce useful products may be listed by way of example such compounds as beta-naphthol, 8 - amino - 2 - naphthol, 8-acetylamino-2-naphthol, benzoyl naphthols; pyrazolones and pyrazyl pyrazolones; hydroxy benzofluorenones; hydroxy derivatives of phenyl naphthylamines such as 7-hydroxy-1-naphthyl-m-hydroxyphenylamine; particularly the various N-substituted amides such as arylides, of 5,6,7,8-tetrahydro-2-hydroxy-3-naphthoic acid, of 2-hydroxy-3-anthroic acid, of methyl and dimethyl salicylic acids, of hydroxy carbazole carboxylic acids, of hydroxy benzocarbazole carboxylic acids, of 3,7-dihydroxy-naphthalene-2,6-dicarboxylic acid, of hydroxy-dibenzofuran carboxylic acids, of hydroxy benzothiophene carboxylic acids, etc., and the arylides of acetoacetic acid, furoyl acetic acid, benzoyl acetic acid, terephthaloyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene oxide or the diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicylic acid, resorcinol, m-phenylene diamine, the large number of naphthol-sulfonic acids such as e. g., R acid, G acid, the Cleve's acids, J acid, gamma acid, J acid urea and J acid imide, H acid and many others. Pyrazolones such as sulfonic derivatives of 1-phenyl-3-methyl pyrazolone-5 also may be used.

The invention will be more fully illustrated in conjunction with the following examples which are meant to be illustrative only and not by way of limitation. All parts are by weight unless otherwise noted.

EXAMPLE 1

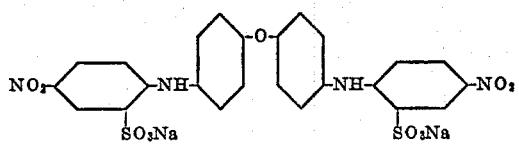

To a solution of 60 parts of sodium 2-chloro-5-nitro-benzene sulfonate in 420 parts of water are added 63 parts of calcium carbonate and 21 parts of 4,4'-diaminodiphenyl ether. The reaction mixture is heated at reflux under an atmosphere of carbon dioxide until the reaction is complete. The reaction mixture is filtered at elevated temperature and the filtrate is chilled below room temperature. Hydrochloric acid is added until the solution is acidic to Congo red test paper. After stirring for one hour, the precipitated material is removed by filtration and the filtrate is recovered. To this filtrate, soda ash is added until the solution is alkaline to brilliant yellow test paper. This solution is heated to 60° C. and is clarified from a small amount of calcium carbonate. The temperature of the filtrate is again lowered and sodium chloride is added to complete precipitation.

The salted-out product is separated by filtration and the residue is washed on the filter with ice water to remove brine. The disodium salt of 4,4' - bis[N - (2'' - sulfo - 4''-nitrophenyl aminoldiphenylether may be rendered chemically pure by recrystallization from dilute methanol.

EXAMPLE 2

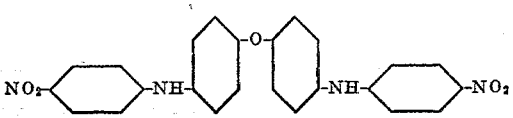

6.5 parts of the product of Example 1 is ground into a thin slurry with 100 parts of 25% hydrochloric acid. The slurry is transferred to a reaction vessel and is heated at gentle reflux for 22 hours. It changes in color from a golden yellow to a deep red-orange. The reaction mixture is cooled, and is diluted with 200 parts of water. The undissolved solid is collected on a filter, washed thoroughly with water, and dried.

4,4'-bis-[N-(4''-nitrophenyl) amino]diphenyl ether may be obtained chemically pure by crystallization from methanol from which it separates in the form of dark red needles and melts at 162.5° C.

EXAMPLE 3

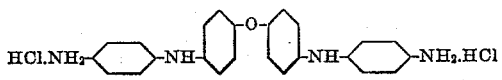

To a suspension of 8.7 parts of 4,4'-bis-N-(4''-nitrophenyl) amino diphenyl ether in 105 parts glacial acetic acid at 70° C. is added over a period of 30 minutes a solution of 35.6 parts stannous chloride dihydrate in 120 parts of concentrated hydrochloric acid. The temperature of the reaction mixture is maintained at 70° C. until reduction is complete as is indicated by loss of color. The temperature is then lowered and the solution is made strongly alkaline to phenolphthalein by addition of 20% sodium hydroxide solution. The resulting almost white diamine is collected on a filter, washed with water, reslurried in dilute sodium hydroxide, recollected on a filter and thoroughly washed with water.

Crystallization from dilute hydrochloric acid produces pure 4,4'-bis[N-(4''-aminophenyl) amino]diphenyl ether dihydrochloride.

EXAMPLE 4

1.0 part of the diamine dihydrochloride as obtained in Example 3 is slurried in 10 parts of water and 5 parts of 17% hydrochloric acid are added. At 15° C. the slurry is tetrazotized with 5% sodium nitrite solution to a positive test against starch iodide paste which persists for 15 minutes. The resulting solution is clarified and is divided into two equal parts. Each part is diluted with 100 parts of water and is chilled to 5° C. 20% sodium acetate is added to each part until the solutions no longer give an acidic reaction to Congo red test paper.

Two pieces of cotton fabric of 5 parts each wet out in 1% soap solution, rinsed in fresh water and these are impregnated in baths of the following composition:

Bath I

| | Parts |
| --- | --- |
| 2-hydroxy-3-naphthoic acid anilide | 1.0 |
| Methanol | 1.0 |
| Sodium hydroxide (20%) | 2.5 |
| Water | 95.5 |

Bath II

| | Parts |
|---|---|
| 2-hydroxy-3-naphthoic acid-(2'-naphthylamide) | 1.0 |
| Beta-ethoxyethanol | 1.0 |
| Sodium hydroxide (20%) | 2.5 |
| Water | 95.5 |

The fabric is agitated in these grounding baths while heating up to and at 45° C. for 15 minutes. The fabric is passed between squeeze rolls.

The cotton piece goods so impregnated are entered into the separate diazo baths prepared as described above and are agitated until color development is complete. They are then individually rinsed, treated in ½% soap solution at 60° C. and rinsed again. The goods are heavily dyed deep maroon to claret shades.

The dyed pieces are then treated at boiling temperature in a bath containing 5% soda ash and 0.5% sodium sulfide. The maroon to claret dyeings are converted to bright, strong blues. After treatment in ½% soap solution at 65° C., rinsing and drying the following colors are obtained:

| Coupling component | Color |
|---|---|
| 2-hydroxy-3-naphthoic acid anilide | Blue of reddish shade. |
| 2-hydroxy-3-naphthoic acid-(2'-naphthylamide) | Strong, greenish blue. |

Example 5

3.7 parts of the diamine dihydrochloride obtained as described in Example 3 are stirred to a smooth paste in 60 parts of water. 9 parts of 17% hydrochloric acid are added, the temperature is adjusted at 15° C. and the diamine is tetrazotized by slow addition of 1.2 parts of sodium nitrite dissolved in 17 parts of water. 12.9 parts of salt are added and the separated solid is filtered off. The residue is reslurried in 150 parts of water, the temperature raised to 45° C. and the solution is clarified in the presence of decolorizing carbon. From the solution by addition of 35 parts of salt, a light brown precipitate forms which is collected on a filter and is washed with 5% soap solution.

The golden brown tetrazo salt is dried at low temperature and is readily soluble in water.

Example 6

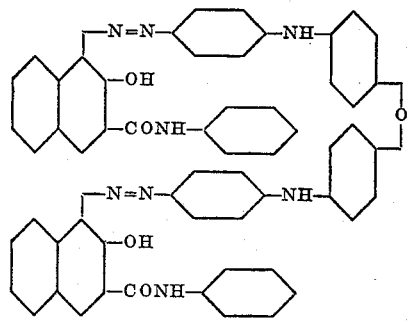

0.24 part of the tetrazonium chloride prepared as in Example 5 is slurried in 3 parts of methanol and is treated with a slurry of 1.5 parts of the anilide of 2-hydroxy-3-naphthoic acid in 3 parts of methanol containing 5 parts of pyridine.

A deep blue-black paste results which is heated ½ hour on a steam bath. This is then diluted with 300 parts of water and 18 parts of 20% sodium hydroxide. The precipitated dyestuff is flocculated by digestion on a steam bath, is collected on a filter and is washed thoroughly with hot water.

After drying, a deep blue-black pigment is obtained insoluble in water.

When, instead of the anilide of 2-hydroxy-3-naphthoic acid, an equivalent quantity of beta-naphthol is substituted in the above preparation, a black to blue pigment, insoluble in water is obtained which has the following formula:

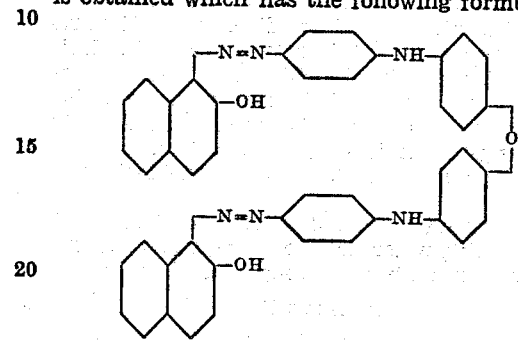

Example 7

3.0 parts of the tetrazonium chloride obtained as described in Example 5 are intimately mixed by blending with 2.9 parts of magnesium sulfate-dihydrate and 0.9 part of anhydrous sodium sulfate.

This color blend is completely stable to storage and is readily soluble in water.

Example 8

2.0 parts of the color blend as prepared in Example 7 are dissolved in 28 parts of water and the solution is treated with 70 parts of suitable carbohydrate thickener. The resulting paste is printed from an engraved roll on cotton fabric which was previously impregnated in an alkaline grounding liquor with the anilide of 2-hydroxy-3-naphthoic acid.

The dried print is cleared in 3% soda ash bath at 65° C., is treated in a ½% soap solution at 70° C., is rinsed and dried.

The fabric is printed a strong blue pattern of very good fastness properties.

Example 9

Five examples of cotton skeins of five parts each are wet out in 1% soap solution, rinsed and passed between squeeze rolls.

These skeins are treated in individual baths containing 1.0 part naphthol, 2.0 parts beta-ethoxyethanol, 2.5 parts of 20% sodium hydroxide and 94.5 parts of water for ¼ hour at 45° C. They are individually wrung out and are dyed in separate baths at room temperature containing 0.3 part of the color blend as prepared in Example 7 dissolved in 200 parts of water and buffered with 3.0 parts of 20% acetic acid and 3 parts of 20% sodium acetate solutions.

When fully dyed, the skeins are cleared at 50° C. in a 3% soda ash bath, treated in a ½% soap solution at 65° C., rinsed and dried. The skeins are dyed as follows:

| Coupling component | Skein dyeing |
|---|---|
| 2-hydroxy-3-naphthoic acid-(4'-chloroanilide) | Greenish blue. |
| Bis-(acetoacetic)-o-tolidide | Golden yellow. |
| 2-hydroxy-carbazole-3-carboxylic acid-(2'-methylanilide) | Dark purple. |
| 2-hydroxy-anthracene-3-carboxylic acid-(2'-methylanilide) | Green. |
| 2-hydroxy-3-naphthoic acid-(2'-ethoxyanilide) | Reddish blue. |

Example 10

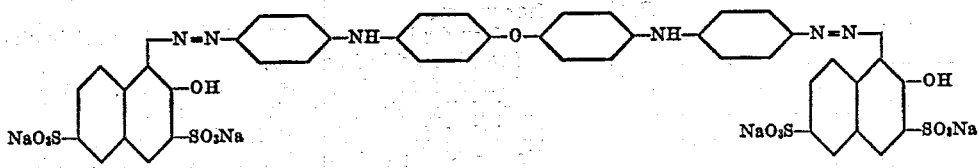

1.6 parts of the mono-sodium salt of 2-naphthol-3,6-disulfonic acid are dissolved in 80 parts of water containing 1.5 parts of soda ash. This solution is well stirred at 5° C. and a solution of 0.6 part of the blended tetrazonium chloride prepared as described in Example 7 dissolved in 15 parts of water is slowly dropped in. An immediate precipitation of a deep blue-black solid forms.

The dyestuff is filtered off and dried at 40° C. It is a dark powder, soluble in water, its aqueous solutions exhibiting a strong blue fluorescence.

Example 11

0.5 part of the dyestuff prepared as described in Example 10 is dissolved in 500 parts of water. 50 parts of this standard solution are diluted with 150 parts of water and 3 parts of 10% sulfuric acid are added. Five parts of wool flannel are wet out in 1% soap solution at the boil, rinsed and dyed in this dye bath at the boil for one hour.

After rinsing, heating at 60° C. in ½% soap solution, rinsing and drying the wool goods are dyed a blue of strong reddish shade.

Example 12

50 parts of the standard dye solution prepared as described in Example 11 are diluted with 100 parts of water and 2 parts of 20% acetic acid are added. 5.0 parts of cotton piece goods previously wet out are agitated in this bath at the boil for one hour.

The cotton fabric is rinsed well and dried. It is dyed a blue of reddish shade.

Example 13

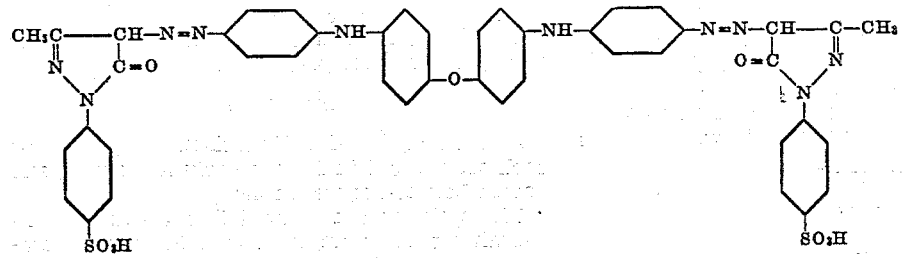

1.5 parts of 1-(4'-sulfophenyl)-3-methyl-5-pyrazolone are dissolved in 80 parts of water containing 1.5 parts of soda ash. The solution is chilled and stirred while there is dropped in a solution of 0.6 part of the blended tetrazonium chloride prepared as in Example 7 dissolved in 15 parts of water. 5 parts of salt are added and the reddish brown precipitate is filtered off and is dried at 40° C.

A red-brown powder is obtained which is soluble in water.

Example 14

0.2 part of the dyestuff prepared as described in Example 13 is dissolved in 150 parts of hot water containing 2 parts of 10% sulfuric acid. Five parts of well boiled out wool flannel are dyed in this bath for one hour at the boil.

The wool is treated in ½% soap solution at 65° C., rinsed and dried. It is levelly dyed a bright red.

Example 15

0.2 part of the dyestuff prepared as described in Example 13 is dissolved in 150 parts of water. 2 parts of 20% acetic acid and 10 parts of 10% Glauber's salt are added. 5.0 parts of well wet out cotton skein are turned in this dye bath as it is heated to and held at the boil for one hour. The skein is removed, is well rinsed in warm water and is dried. It is brightly dyed a rose color.

We claim:

1. Disazo coloring matter having the following formula:

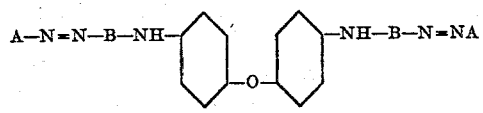

in which A is the residue of a coupling component and B is an unsubstituted para-phenylene radical.

2. A disazo coloring matter having the following formula:

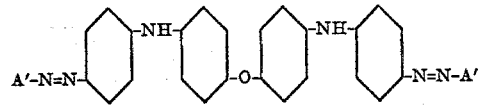

in which A' is a residue of an ice color coupling component.

3. A disazo coloring matter having the following formula:

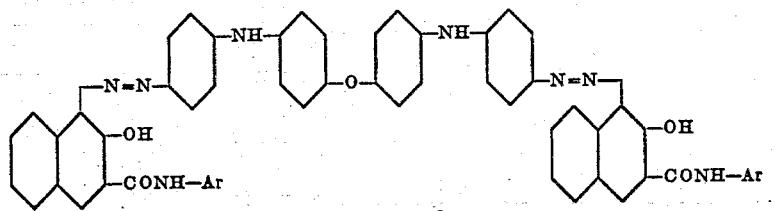

in which Ar is aryl.

4. A disazo coloring matter having the following formula:
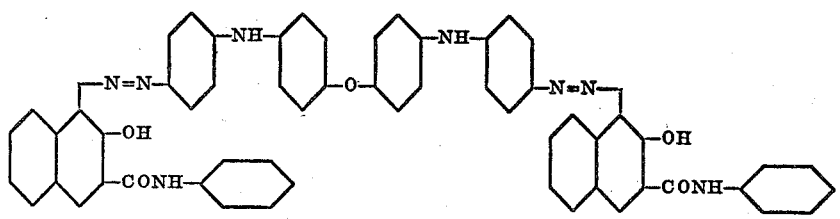
5. A disazo coloring matter having the following formula:
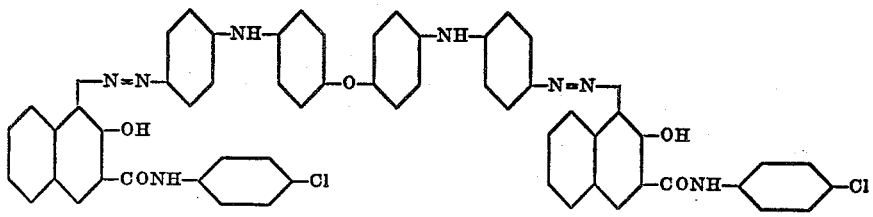
6. A disazo coloring matter having the following formula:
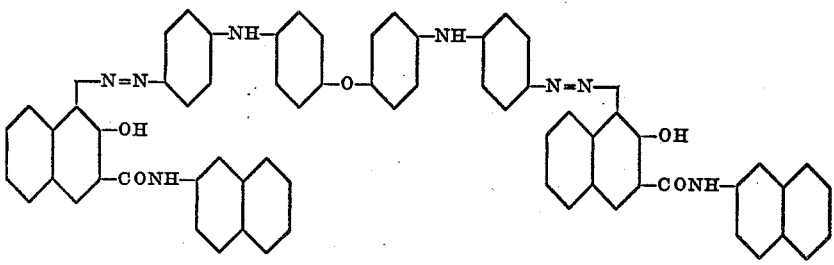
HANS Z. LECHER.
ROBERT P. PARKER.
JOHN J. DENTON.